(12) United States Patent
Di Fiore et al.

(10) Patent No.: US 6,323,274 B1
(45) Date of Patent: Nov. 27, 2001

(54) USE OF POLYAMIDES AS DEFORMATION STABILIZERS FOR POLYMERS

(75) Inventors: Carmine Di Fiore, Sorrento; Fabio Berti, Campi Bisenzio; Angela Rossini, Milan, all of (IT)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/381,154

(22) PCT Filed: Mar. 5, 1998

(86) PCT No.: PCT/EP98/01230

§ 371 Date: Sep. 14, 1999

§ 102(e) Date: Sep. 14, 1999

(87) PCT Pub. No.: WO98/41570

PCT Pub. Date: Sep. 24, 1998

(30) Foreign Application Priority Data

Mar. 14, 1997 (DE) .............................................. 197 10 523

(51) Int. Cl.⁷ .................................................... C08L 77/00
(52) U.S. Cl. ............................................. 524/538; 524/514
(58) Field of Search ....................................... 524/538, 514

(56) References Cited

U.S. PATENT DOCUMENTS

| | | | |
|---|---|---|---|
| 3,741,930 | 6/1973 | Bonvicini et al. | 260/41 C |
| 4,032,600 | 6/1977 | MacAdams et al. | 260/897 B |
| 4,340,528 | 7/1982 | Marsh | 524/513 |
| 4,786,678 | 11/1988 | Dobreski et al. | 524/528 |
| 5,219,627 | * 6/1993 | Arase | 428/35.7 |
| 5,472,495 | 12/1995 | Schroeder | 106/493 |
| 5,585,433 | * 12/1996 | Yamamoto | 525/66 |

FOREIGN PATENT DOCUMENTS

| | | |
|---|---|---|
| 20 35 094 | 1/1971 | (DE) . |
| 4 313 090 | 10/1994 | (DE) . |
| 44 08 276 | 9/1995 | (DE) . |
| 6 329811 | 11/1994 | (JP) . |
| WO93/10191 | 5/1993 | (WO) . |

OTHER PUBLICATIONS

Derwent Abstract, AN–96–180569/19.
Derwent Abstract, AN–95–158465/21.
Derwent Abstract, AN–94–279516/34.
Derwent Abstract, AN–94–174313/21.
Derwent Abstract, AN–93–356869/45.
Derwent Abstract, AN–93–105220/13.
Derwent Abstract, AN–93–078451/10.
Derwent Abstract, AN–92–027991/04.
Derwent Abstract, AN–91–290389/40.
Derwent Abstract, AN–91–165988/23.
Derwent Abstract, AN–89–057307/08.
Derwent Abstract, AN–88–300915/43.
Derwent Abstract, AN–88–068897/10.
Derwent Abstract, AN–86–312665/48.
Derwent Abstract, AN–86–085018/13.
Derwent Abstract, AN–86–023121/04.
Derwent Abstract, AN–85–175001/29.
Derwent Abstract, AN–85–131162/22.
Derwent Abstract, AN–85–129337/22.
Derwent Abstract, AN–84–258588/42.
Derwent Abstract, AN–84–207521/34.
Derwent Abstract, AN–84–070234/12.
Derwent Abstract, AN–82–93278E/44.
Derwent Abstract, AN–80–01998C/02.
Derwent Abstract, AN–79–68594B/38.
Derwent Abstract, AN–77–91348Y/51.
Derwent Abstract, AN–76–10725X/06.
Derwent Abstract, AN–75–62724W/38.
Derwent Abstract, AN–75–56274W/34.
Derwent Abstract, AN–75–53065W/32.
Derwent Abstract, AN–75–53064W/32.
Derwent Abstract, AN–75–26599W/16.
Derwent Abstract, AN–75–13067W/08.
Derwent Abstract, AN–74–49254V/27.
Derwent Abstract, AN–73–71185U/47.
Derwent Abstract, AN–94–334323/42.
Derwent Abstract, AN–93–017556/02.
Derwent Abstract, AN–92–042159/06.
Derwent Abstract, AN–95–048933/07.
Derwent Abstract, AN–92–085309/11.
Derwent Abstract, AN–77–48698Y/27.

* cited by examiner

*Primary Examiner*—Paul R. Michl
(74) *Attorney, Agent, or Firm*—John E. Drach; Steven J. Trzaska

(57) ABSTRACT

A process for making an injection-molded article having reduced warpage comprising:
(a) providing a crystalline polymer selected from the group consisting of a high-density polyethylene, a polyolefin, a polyacrylate, a polyacrylamide, a polyvinyl acetate, a polyethylene imine, a polyoxymethylene, and mixtures thereof;
(b) providing an organic pigment;
(c) providing a polyamide;
(d) mixing (a)–(c) to form a polymer mixture; and
(e) injection molding the polymer mixture to form the injection-molded article having reduced warpage.

20 Claims, No Drawings

USE OF POLYAMIDES AS DEFORMATION STABILIZERS FOR POLYMERS

BACKGROUND OF THE INVENTION

This invention relates to the addition of polyamides to crystalline polymers pigmented with organic pigments, to a process for the production of crystalline polymers, to injection-molded articles with improved performance properties produced therefrom and to preparations containing polyamides and organic pigments.

Crystalline polymers, such as in particular high-density polyethylene, are widely used for the production of injection-molded articles, such as for example plastic casks, crates, bottles or garden furniture. To this end, the melted polymer is injected into the mold, generally at around 300° C., the mold is then gradually cooled and, finally, the injection molding is removed from the mold. In many cases, it is desirable to produce colored products so that pigments are added to the polymer melts. Phthalocyanines, for example, are used to produce intensive blue and green tones while azo dyes or anthraquinone dyes, for example, are used for red and orange tones. However, a disadvantage in this regard is that, above a critical concentration of around 50 ppm, these organic dyes are capable of interacting with the polymers so that the crystal structure is disturbed. This is reflected in deformation (so-called warpage) of the injection-molded articles, i.e. a surface which, in principle, ought actually to have been flat corresponding to the injection mold develops undulations instead, with the result that, for example, the products are very difficult to stack. Another major disadvantage is that the crystal structure is occasionally disturbed so seriously that cracks and fractures can form in the material on cooling. It will readily be appreciated that, for example, a plastic cask which develops cracks after storage overnight outdoors has no further practical use.

There has been no shortage of attempts in the past to remedy this problem. However, these attempts largely come down to the use of inorganic pigments as opposed to organic pigments. Unfortunately, this seriously restricts the color spectrum. Another possible solution is to allow the injection-molded articles to cool over long periods in the mold. This does not of course help the throughput. German patent application DE-A1 4313090 (BASF) describes a process for avoiding warpage effects in injection-molded articles of HDPE which is characterized by the use of organic pigments which have been subjected to a low-temperature plasma treatment. This process is clearly unsuitable for operation on an industrial scale on account of the large amount of equipment involved. In addition, the crystallinity of the polymer can be reduced by co-condensing corresponding comonomers such as, for example, polypropylene or maleic anhydride [JP-A Hei 06/329811 (Showa Denko KK); U.S. Pat. No. 4,032,600 (Chemplex)]. However, polymers of this type do not necessarily satisfy the requirements involved.

Accordingly, the complex problem addressed by the present invention was to provide additives which would stabilize crystalline polymers pigmented with organic pigments, preferably HDPE pigmented with phthalocyanines, in such a way that warpaging and cold fractures no longer occur.

DESCRIPTION OF THE INVENTION

The present invention relates to the use of polyamides as warpage stabilizers for the production of crystalline polymers pigmented with organic pigments.

It has surprisingly been found that even the addition of small quantities of polyamides to crystalline polymers pigmented with organic pigments clearly reduces warpaging during injection molding and produces a lasting improvement in low-temperature resistance. This effect is of particular relevance when the properties of HDPE pigmented with phthalocyanine pigments or injection-molded articles produced therefrom have to be improved by addition of polyamides based on dimer fatty acid and aromatic diamines.

Polyamides

Polyamides preferably used as stabilizers are condensation products of (a) dicarboxylic acids corresponding to formula (I):

HOOC—X—COOH                                     (I)

in which X is a linear or branched alkylene group containing 4 to 10 carbon atoms or the residue of the dimer fatty acid, with (b) diamines corresponding to formula (II):

$H_2N$—Y—$NH_2$                                     (II)

in which Y is a linear or branched alkylene group containing 4 to 10 carbon atoms or an optionally $C_{1-8}$-alkyl-, amino- or hydroxy-substituted phenyl radical. Typical examples are polyamides obtained by condensation of adipic acid, 1,12-dodecanedioic acid or dimer fatty acid with hexamethylenediamine, diaminobenzene or triaminobenzene. It has proved to be of particular advantage to use dimer fatty acid as the dicarboxylic acid. Dimer fatty acid is prepared by dimerization of oleic acid and has a total of 36 carbon atoms. In the course of the reaction, an unsaturated cycle is formed in the molecule. The dimer fatty acid may be used as a pure fraction or as the technical mixture which is directly obtained in the dimerization reaction and which still contains branched monomeric carboxylic acids and trimers. In addition, polyamides in the form of condensation products of dimer fatty acid with aromatic diamines, more especially diaminobenzene and triaminobenzene, have proved to be particularly effective stabilizers. The condensation of the two components is accompanied by the formation of a three-dimensional network structure which adapts itself ideally, more particularly to the crystalline structure of the HDPE, and is thus capable of correcting crystallinity defects. Polyamides of the type mentioned are described, for example, in German patent application DE-A1 4408276 (Henkel) to the teaching of which reference is specifically made here. The polyamides are used in quantities of normally 0.01 to 49.9% by weight, preferably 0.1 to 10% by weight and more preferably 1 to 5% by weight, based on the crystalline polymers.

Crystalline Polymers

The problem of warpage and cold cracking affects almost all crystalline olefins when organic pigments are added to them. Accordingly, the present invention also applies, for example, to polyolefins, polyacrylates, polyacrylamides, polyvinyl acetates, polyethylene imines and polyoxymethylenes. However, the greatest technical and economic impact of this problem is on pigmented high-density polyethylene and injection-molded articles produced therefrom because these polymers have particularly high crystallinity and are capable of interacting particularly easily with organic pigments, for example via the central metal atoms in phthalocyanines complexes. As already mentioned, the polyamides to be used in accordance with the invention, particularly those based on dimer fatty acid and aromatic diamines, adapt themselves particularly well to the crystal structure of HDPE in particular, so that improving the properties of high-density polyethylene is not only a central problem addressed by the invention, the proposed solution is also particularly suitable for this purpose.

Organic Pigments

In practice, injection-molded articles based on crystalline polymers, especially HDPE, are only susceptible to warpage and cold cracking when they contain organic pigments. The use of phthalocyanine complexes which can be obtained by reacting metal chlorides with phthalodinitrile and which correspond to formula (III):

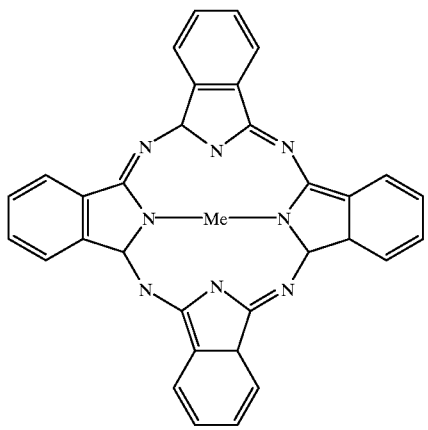

(III)

where Me is a divalent metal, for example iron, manganese, nickel, cobalt and especially copper, is particularly sensitive. Another group of organic pigments to which the invention applies are azo compounds, especially in the form of azo pigments converted into color lakes. Azo dyes are normally obtained by the action of a diazonium compound on an amine, phenol or on the sulfonic or carboxylic acid group of an amine, phenol or naphthol. Another group of suitable organic pigments are the anthraquinone dyes which correspond to general formula (IV):

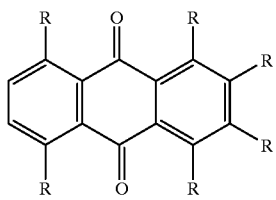

(IV)

where R is hydrogen or hydroxyl. Typical examples where the system of substituents was permutated are anthraquinone, alizarin, quinizarin, chrysazin, hystazarin, purpurin, chrysophanic acid, quinalizarin and flavopurpurin. The pigments are used in quantities of normally 0.01 to 5% by weight and more particularly 0.07 to 1% by weight, based on the crystalline polymers.

Fillers, Auxiliaries and Additives

It has proved to be of advantage to use the polyamides—rather than on their own—in conjunction with other additives which, on the one hand, support the stabilizing effect and, on the other hand, are capable of improving the performance of the plastics in other respects. In a particularly preferred embodiment, the polyamides are used together with fillers, for example calcium carbonate, which makes the polyamide easier to disperse in the polymer. In this case, the filler is used in a quantity of about 0.01 to 5% by weight and preferably 0.5 to 1.5% by weight, based on the crystalline polymers.

Other additives which may be used together with the polyamides and the calcium carbonate are UV stabilizers, antioxidants, metal deactivators, lubricants (for example fatty alcohols, dicarboxylic acid esters, fatty acid esters, fatty acids, soaps, fatty acid amides, polyethylene waxes), silicone oils and silicone resins, blowing aids (hydrazines, semicarbazides, tetrazoles, benzoxazines, azodicarboxylic amides, metal hydrides), anti-fogging agents, antistatic agents (quaternary ammonium salts, alkyl sulfonates, partial glycerides, polyols, polyglycols, glycerol, amine ethoxylates), antiblocking agents (silica, mineral fibers, talcum), flameproofing agents (phosphoric acid esters, chloroparaffins, antimony trioxide), crosslinking agents (organic peroxides), fillers (aluminium trihydrate, barium sulfate, graphite, glass fibers, kaolin, metal oxides), plasticizers (dimethyl phthalate, tri-2-ethylbutyl phosphate, di-2-ethylhexyl adipate), optical brighteners, inorganic pigments (titanium dioxide) and metal salts (calcium, barium or zinc stearate).

Process

The present invention also relates to a process for the production of crystalline polymers pigmented with organic pigments and consumer articles with improved dimensional stability and heat resistance produced therefrom, in which polyamides are added as stabilizers to the polymer melts before or during injection molding. In one particular embodiment of the invention, 0.01 to 5% by weight and preferably 0.07 to 1% by weight of organic pigments, preferably phthalocyanine pigments, 0.01 to 5% by weight and preferably 0.1 to 3% by weight of a condensation product of dimer fatty acid with an aromatic diamine and optionally 0.01 to 5% by weight and preferably 0.5 to 1.5% by weight of calcium carbonate are added to high-density polyethylene before it is injection-molded. The polymer melt is heated to around 300° C. and injected into the mold from which the injection molding is removed after cooling.

Commercial Applications

The polyamides and the other auxiliaries may of course be added individually to the crystalline polymers. However, it has proved to be of advantage initially to prepare a powder-form premix and then to granulate the premix thus formed together with polyethylene. Accordingly, the present invention also relates to powder-form preparations ("premixes") containing (a) organic pigments,
(b) polyamides and optionally
(c) fillers and other auxiliaries and additives.

The powder-form preparations typically contain (a) 5 to 20% by weight and preferably 10 to 15% by weight of pigments, preferably phthalocyanines,
(b) 40 to 80% by weight and preferably 40 to 60% by weight of polyamides, preferably condensation products of dimer fatty acid with aromatic diamines, and
(c) 0 to 50% by weight and preferably 30 to 40% by weight of calcium carbonate, with the proviso that the quantities add up to 100% by weight, optionally with other auxiliaries and additives. Finally, the present invention relates to granular preparations containing (a) organic pigments,
(b) polyamides,
(c) crystalline polymers and optionally
(d) fillers and other auxiliaries and additives.

To produce the granules (master batch), the crystalline polymer, preferably HDPE, is melted, after which 1 to 2% by weight of the premix is added and the resulting mixture is extruded in known manner at 140 to 200° C. and granulated. The resulting granules contain the organic pigments and the stabilizers and may readily be added as "concentrates" to the crystalline polymers before injection molding. This also has the advantage that the risk of emission of health-endangering dusts from the powder-form pigments is avoided.

EXAMPLES 70 ppm of copper phthalocyanine and optionally stabilizers were added to high-density polyethylene (molecular weight ca. 2,000,000 dalton). The melt was then heated to around 290° C. and introduced into an injection mold for the production of crates with a volume of 100 l. The injection mold was cooled and the injection molding was evaluated according to the following criteria:

(a) Warpage. The bottom of the crates was subjectively assessed for flatness on the following scale: (1)=flat, (2)=some unevenness, (3)=distinct unevenness, (4)= serious unevenness.

(b) Low-temperature resistance. The crates were stored for 3 days at 0° C. and then examined for cracks and fractures. The symbols used in this regard have the following meanings: (+)=no cracks or fractures, (−)= crack formation, (−−)=fractures.

The results are set out in Table 1.

TABLE 1

Investigation of HDPE injection moldings with and without stabilizers (quantities in % by weight)

| Stabilizers/performance | 1 | 2 | 3 | 4 | 5 | C1 | C2 |
|---|---|---|---|---|---|---|---|
| Macromelt 6208* | 0.5 | 1.0 | 1.5 | 1.0 | 1.5 | – | – |
| Calcium carbonate | – | – | – | 0.5 | 0.5 | – | 1.5 |
| Properties | | | | | | | |
| Warpage | 2 | 2 | 2 | 2 | 1 | 4 | 4 |
| Cold cracking | – | + | + | + | + | −− | −− |

*)condensation product of dimer fatty acid with triaminobenzene (Henkel SpA, Fino/Italy)

What is claimed is:

1. A process for making an injection-molded article having reduced warpage comprising:
   (a) providing a crystalline polymer selected from the group consisting of a high-density polyethylene, a polyolefin, a polyacrylate, a polyacrylamide, a polyvinyl acetate, a polyethylene imine, a polyoxymethylene, and mixtures thereof;
   (b) providing an organic pigment;
   (c) providing a polyamide;
   (d) mixing (a)–(c) to form a polymer mixture; and
   (e) injection molding the polymer mixture to form a desired article of manufacture.

2. The process of claim 1 wherein the polyamide is a condensation product of:
   (a) a dicarboxylic acid corresponding to formula (I):

   HOOC—X—COOH        (I)

wherein X is a linear or branched alkylene group containing from 4 to 10 carbon atoms or a residue of a dimer fatty acid; and
   (b) a diamine corresponding to formula (II):

   H$_2$N—Y—NH$_2$        (II)

wherein Y is a linear or branched alkylene group having from 4 to 10 carbon atoms or a C$_{1-8}$ alkyl-, amino-, or hydroxy-substituted phenyl radical.

3. The process of claim 1 wherein the polyamide is a condensation product of a dimer acid and a co-reactant selected from the group consisting of diaminobenzene, triaminobenzene and mixtures thereof.

4. The process of claim 1 wherein the crystalline polymer is a high-density polyethylene.

5. The process of claim 1 wherein the organic pigment is selected from the group consisting of a phthalocyanine, an azo compound, an anthraquinone derivative, and mixtures thereof.

6. The process of claim 1 wherein the polyamide is employed in an amount of from 0.01 to 49.9% by weight, based on the weight of the crystalline polymer.

7. The process of claim 1 wherein the polyamide and organic pigment are first combined to form a powder-form premix, and wherein the powder-form premix is then mixed with the crystalline polymer.

8. The process of claim 1 wherein (a)–(c) are in granular form.

9. The process of claim 1 wherein the polymer mixture further contains an additive in an amount of from 0.01 to 5% by weight, based on the weight of the crystalline polymer.

10. The process of claim 9 wherein the additive is calcium carbonate.

11. A composition comprising:
    (a) a crystalline polymer selected from the group consisting of a high-density polyethylene, a polyolefin, a polyacrylate, a polyacrylamide, a polyvinyl acetate, a polyethylene imine, a polyoxymethylene, and mixtures thereof;
    (b) an organic pigment; and
    (c) a polyamide.

12. The composition of claim 11 wherein the polyamide is a condensation product of:
    (a) a dicarboxylic acid corresponding to formula (I):

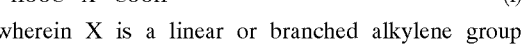
    HOOC—X—COOH        (I)

wherein X is a linear or branched alkylene group containing from 4 to 10 carbon atoms or a residue of a dimer fatty acid; and
    (b) a diamine corresponding to formula (II):

    H$_2$N—Y—NH$_2$        (II)

wherein Y is a linear or branched alkylene group having from 4 to 10 carbon atoms or a C$_{1-8}$ alkyl-, amino-, or hydroxy-substituted phenyl radical.

13. The composition of claim 11 wherein the polyamide is a condensation product of a dimer acid and a co-reactant selected from the group consisting of diaminobenzene, triaminobenzene and mixtures thereof.

14. The composition of claim 11 wherein the crystalline polymer is a high-density polyethylene.

15. The composition of claim 11 wherein the organic pigment is selected from the group consisting of a phthalocyanine, an azo compound, an anthraquinone derivative, and mixtures thereof.

16. The composition of claim 11 wherein the polyamide is employed in an amount of from 0.01 to 49.9% by weight, based on the weight of the crystalline polymer.

17. The composition of claim 11 wherein the composition further contains an additive in an amount of from 0.01 to 5% by weight, based on the weight of the crystalline polymer.

18. The composition of claim 17 wherein the additive is calcium carbonate.

19. The composition of claim 11 wherein the organic pigment is employed in an amount of from 0.01 to 5% by weight, based on the weight of the crystalline polymer.

20. An injection-molded article made from the composition of claim 11.

* * * * *